United States Patent [19]

Bobinger et al.

[11] Patent Number: 4,893,857
[45] Date of Patent: Jan. 16, 1990

[54] TELESCOPIC ENERGY ABSORBER UNIT FOR VEHICLE BUMPER MOUNTING

[75] Inventors: David A. Bobinger, Middletown; Abayomi O. Folarin; James H. Childress, both of Dayton, all of Ohio

[73] Assignee: General Motors Corporation, Detroit, Mich.

[21] Appl. No.: 240,291

[22] Filed: Sep. 6, 1988

[51] Int. Cl.⁴ .................... B60R 19/30; B60R 19/28
[52] U.S. Cl. ............................. 293/136; 293/132; 293/137
[58] Field of Search .............. 293/136, 104, 110, 124, 293/132, 135, 137; 188/268, 371, 376, 377, 372

[56] References Cited

U.S. PATENT DOCUMENTS

| | | | |
|---|---|---|---|
| 3,039,757 | 6/1962 | Barr | 188/268 |
| 3,130,964 | 4/1964 | Johnson | 188/268 |
| 3,144,228 | 8/1964 | Kass | 188/268 |
| 3,361,467 | 1/1968 | Ludwikowski | 293/136 |
| 3,741,560 | 6/1973 | Schaller | 293/136 |
| 3,751,020 | 8/1973 | Kendall et al. | 188/268 |
| 3,841,683 | 10/1974 | Toro | 293/136 |
| 3,948,497 | 4/1976 | Lovitt et al. | 188/268 |
| 4,200,318 | 4/1980 | Gute et al. | 293/136 |
| 4,591,030 | 5/1986 | Antkowiak | 188/268 |
| 4,624,493 | 11/1986 | Hillebrand et al. | 293/132 |

Primary Examiner—Andres Kashnikow
Assistant Examiner—Mark T. Le
Attorney, Agent, or Firm—Charles R. White

[57] ABSTRACT

A telescopic energy absorbing unit that operatively interconnects the bumper and the frame of the vehicle which incorporates an elastomeric energy absorbing medium within the tubular components of the unit and a resilient preload piston in series therewith to assure preload of the bumper and its assured positioning at a station outwardly after permanent foreshortening is experienced in the elastomer energy absorbing medium subsequent to its deflection from an impact load.

7 Claims, 1 Drawing Sheet

U.S. Patent
Jan. 16, 1990
4,893,857
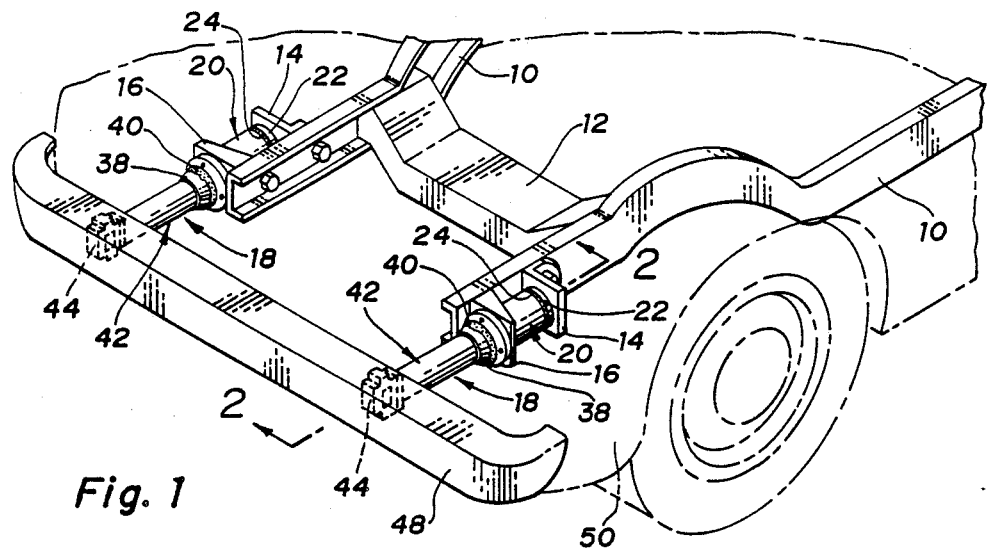
Fig. 1
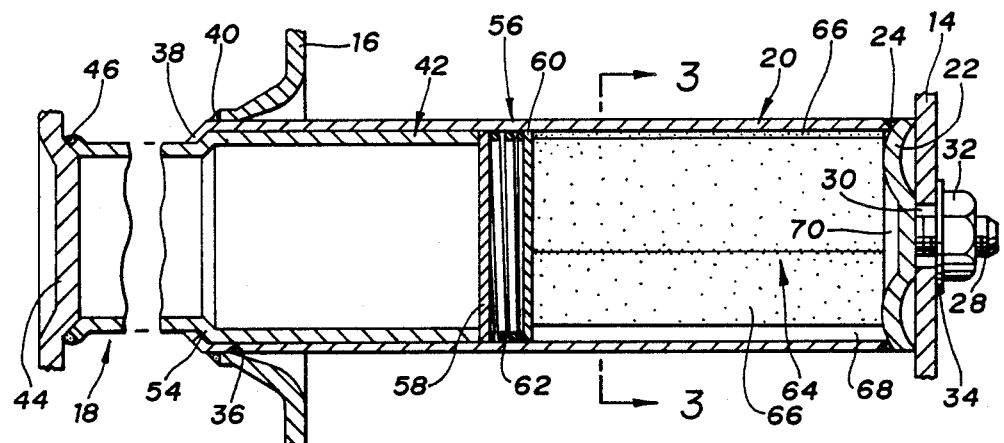
Fig. 2
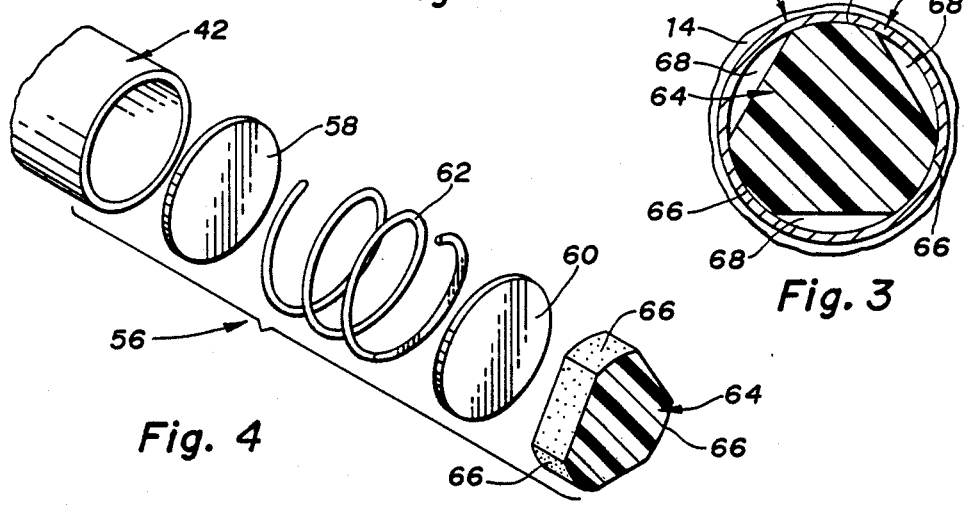
Fig. 3
Fig. 4

TELESCOPIC ENERGY ABSORBER UNIT FOR VEHICLE BUMPER MOUNTING

FIELD OF INVENTION

This invention relates to telescoping energy absorbers for mounting a vehicle bumper to support structure in a vehicle and more particularly to a new and improved telescoping energy absorbing unit which incorporates an elongated energy absorbing medium of a resilient plastic material and cooperating expandable preload spring piston unit to assure preload and full time firm support of bumper in a pre-impact position.

DESCRIPTION OF THE RELATED ART

Various prior art energy absorber units which are employed as bumper supports for a vehicle incorporate energy absorbing mediums of resilient plastics material within housings attached to the vehicle frame work or other support structure. Under bumper impact situations these energy absorbing mediums are loaded in compression or tension as the bumper moves from a designed outer position toward the vehicle body work and are operative to absorb the energy of impact. After impact, these mediums recover at various rates to return the associated bumper assembly toward its original pre-impact position. While these energy absorber units generally provide effective energy absorption they generally do not provide for effective preload to maintain a firm bumper pre-impact position and to prevent bumper vibration particularly after the energy absorbing medium has been deflected and reduced in effective length because of permanent set.

SUMMARY OF THE INVENTION

The present invention is of the general category of the above described prior art and incorporates an elongated cylinder tube which is adapted to be supported by the vehicle frame work or other support structure within the vehicle. Disposed within this cylinder tube is an elastomeric energy absorbing medium in the form of an elongated bar generally triangular in cross section having a high degree of resilience which seats at the rear of the tube and extends forwardly to a terminal end. Disposed immediately outboard of this energy absorber medium and in series therewith is a resilient preload piston unit comprised of a pair of disks in which there is a compressible spring member therebetween which defines an expandable preload piston unit. Immediately outboard of the preload piston unit is an elongated piston tube which telescopes within the cylinder tube and extends from contact therewith to a terminal point to which attachment is made to the bumper assembly that extends across the associated end of the vehicle. Stops built into the cylinder tube and piston tube limit the extent to which the piston tube can stroke outwardly and thus the outward position of the bumper is fixed. The expandable preload piston unit provides a spring force that assures preload after permanent deformation and foreshortening is experienced in the elastomer energy absorbing medium resulting from bumper impact loads. The force of restitution provided by the energy absorber medium plus that of the expending preload piston will reposition the bumper to its original pre-impact position at a slow and predetermined rate after removal of the impact load. Preload piston expansions compensate for any permanent deformation or foreshortening experienced in the elastomer bar due to the impact. Accordingly, this invention, there is a built-in automatic adjustment device to take up the space of the energy absorber after initial impact or after subsequent impacts in the event that the energy absorber does not return to its full length. This also assures that any subsequent energy absorber operation will be effective without lag. Importantly, the preload piston maintains the tubes of the energy absorber in their outer stop position to prevent bumper vibration and rocking of the piston tube in the cylinder tube resulting in fatigue of these components. Accordingly, this invention thereby enhance durability of the energy absorber units and comfort of the vehicle occupants.

DESCRIPTION OF THE DRAWING

FIG. 1 is a pictorial view of a pair of energy absorber units according to this invention connecting a bumper to vehicle framework.

FIG. 2 is a view taken generally along lines 2—2 of FIG. 1.

FIG. 3 is a cross-sectional view taken along lines 3—3 of FIG. 2.

FIG. 4 is a pictorial exploded view of a resilient piston assembly utilized in this invention along with portions of the energy absorber and the support tube therefor.

DESCRIPTION OF THE PREFERRED EMBODIMENTS

Referring now particularly to FIG. 1 of the drawing, there is shown an end portion of a chassis frame of an automotive vehicle that includes a pair of laterally spaced and longitudinally-extending side rails 10, which are interconnected with a cross member 12. Bolted or otherwise secured to the sides of the ends of each of the side rails 10 are a pair of L-shaped brackets 14, 16 that are longitudinally aligned and connect laterally spaced energy absorber units 18 to the chassis frame 10. Each energy absorber unit 18 has an outer support cylinder 20 that is closed by a disk-like end cap 22 which is welded at 24 to the inboard end thereof. The end cap 22 has a threaded stud 28 fixed to the center thereof that extends rearwardly through an opening 30 in the leg of inner bracket 14. Nut 32 threaded onto stud 28 and firmly seated on the washer 34 secures the outer support cylinder 20 to bracket 14. From the leg of bracket 14, the support cylinder 20 extends longitudinally through a circular opening 36 in the laterally extending leg of bracket 16 to an end stop defined by an inwardly extending and conical crimp 38. The support cylinder 20 is connected to bracket 16 by an annular weld 40.

In addition to the support cylinder 20, each energy absorber unit 18 has a stepped diameter tubular piston rod 42 which is mounted for limited telescoping movement within the support cylinder 20 and which projects therefrom to a forward end defined by an end plate 44 secured thereto by weld 46. End plate 44 is connected to a bumper bracket 46 which in turn is secured by a suitable fastener means (not shown) to a bumper assembly 48 extending across the end of the vehicle body work 50. The conical step or stop shoulder 54 of piston rod 42 contacts the inner wall of an annular crimp 38 in the forward end of the support cylinder 20 under spring preload as will be further described below to limit the outer extent to which the piston rod can stroke.

Operatively mounted in support cylinder 20 and at the inner end of the piston rod 42 is a preload piston assembly 56 which, as shown in FIGS. 2 and 4, comprised of a pair of annular disks 58 and 60 laterally spaced apart and between which is interposed a metallic helical spring 62. One function of this internal spring loaded piston assembly is to stack under bumper impact for load transmitted to the primary energy absorbing medium of this invention, provided by an elongated bar 64 of a resilient thermoplastic material such as HYTREL. The elongated bar 64 is generally triangular in cross section with arcuate and spaced truncations 66 to contact the inner diameter of the support tube 20 at the three equi-distant segments of the inner wall of tube 20 as shown in FIG. 3. The energy absorber bar 64 extends from the inner disk 60 of the resilient piston assembly 56 into seating contact with the end cap 22 of the support cylinder 20 as shown best in FIG. 2.

In the event that there is an impact load applied to bumper 48 of sufficient magnitude, the bumper assembly strokes toward the body work 50 of the vehicle. The linearly stroking piston rod 42 and disk 58 of the piston assembly effects the deflection of the helical spring 62 preferably without any substantial immediate deflection or deformation of the energy absorbing bar 64 which provides the ground, since it is seated on end cap 22. As soon as the coils of the spring stack on one another and the spring becomes solid, the impact load is transmitted to the resilient energy absorbing bar 64. On receiving this load, the bar foreshortens and portions thereof deflect into the axially elongated and arcuate spaces 68 formed between the bar 64 and the inner wall of cylinder 20 as well as the space 70 at the end thereof. This deflection plus the friction between the cylinder 20 and the energy absorber bar effectively dissipates the impact load. On removal of the load, the energy absorber bar 64 will recover, preferably at a slow rate as primarily determined by the material used for bar 64, back toward its original dimensions. Accordingly the force of restitution of bar 64 will stroke the piston rod outwardly to move the bumper 48 toward its pre-impact position. This invention importantly ensures that this positioning will occur even when the impact load effects a permanent deformation or foreshortening of the elastomer energy absorbing bar 64. For example, the energy absorbing bar might have 98% recovery of its original installed length so that the bumper would, in the absence of preload piston 56, be returned to a position short of that the designed position illustrated in FIG. 1. However, in view of the fact that the preload piston assembly has the capabilities of expanding because of the force of spring 62, the piston tube and the bumper assembly will be returned to their original position as determined by the engagement of the stop shoulder 54 with the crimp 38. This preload maintains the bumper assembly in its operational position regardless of any foreshortening of the energy absorbing bar and keeps the bumper assembly from vibrating and the piston rod from rocking or "chucking" within the piston tube. Accordingly, this invention reduces fatigue and mechanical wear of parts and enhances service life of energy absorber units in which it is employed and contributes to riding comfort for the vehicle occupants.

This device permits the tuning of impact energy absorption by the proper sizing of the preload spring and the elastomeric bar and by selection of bar and its energy absorbing capabilities. This invention allows a wider range of size variation in the energy absorber bars and other components of the unit 18 to enhance quantity production. The expandable preload piston can be located between the elastomeric energy absorber and the end cap if desired.

While a preferred embodiment of this invention has been shown and described to illustrate the principles thereof, other embodiments will become apparent to those skilled in the art. Accordingly, this invention is set forth in the following claims.

The embodiments of the invention in which an exclusive property or privilege is claimed are defined as follows:

1. An energy absorbing unit for mounting a bumper assembly at a predetermined and pre-impact position relative to an automobile comprising:
   (a) a support cylinder defining a chamber;
   (b) an energy absorbing medium of resilient elastomeric material operatively mounted in said chamber said energy absorbing medium including a plurality of longitudinal side walls parallel to the longitudinal axis of said energy absorbing medium, and only some of said side walls being in full-time engagement with an inner wall of said support cylinder;
   (c) compressed, resilient preload piston means operatively mounted in said chamber for full-time engagement therewith and operatively associated at a first end with said energy absorbing medium;
   (d) a piston tube having an inner end engaging a second end of said preload piston means and extending from said support cylinder to an outer end for operative connection with the bumper assembly;
   whereby an impact load applied to said bumper assembly will cause the deflection of said preload piston means and the subsequent deflection of said energy absorber medium so that said impact load is stored, said energy absorbing medium and said preload piston means providing a force of restitution to move said piston tube outwardly and said bumper assembly to said pre-impact position subsequent to removal of said impact load.

2. An energy absorber unit for mounting a bumper assembly to support structure of an automobile comprising:
   (a) first and second telescopic connector means, wherein said first connector means has an inner end operatively connected to the support structure and said second connector means has an outer end operatively connected to the bumper assembly;
   (b) stop means operatively interposed between said first and second connector means to limit the distance to which said first and second connector means can be extended;
   (c) an energy absorber means of plastic material having an optimized degree of resilience operatively mounted within said first connector means with full-time engagement with an inner wall thereof, said energy absorber means including a plurality of longitudinal side walls parallel to the longitudinal axis of said energy absorber means, and only some of said side walls being in full-time engagement with said inner wall of said first connector means;
   (d) means mounting said second connector means for telescopic movement with respect to said first connector means;
   (e) said second connector means having an outer end extending outwardly of said first connector means and operatively connected to said bumper assembly;

(f) said second connector means having an inner end for effecting the deformation of said plastic energy absorber means in response to an impact load applied to said bumper assembly so that the energy of impact load is stored; and (g) compressed preload spring means operatively mounted in said chamber and operatively associated with said resilient energy absorber means to provide a preload for urging said bumper assembly to it said second telescopic connector means with said stop means.

3. A telescoping energy absorber for mounting a vehicle bumper assembly to support structure in a vehicle, the energy absorber comprising:

(a) a hollow support cylinder attached to the vehicle support structure and defining a chamber;

(b) an elastic energy absorbing medium operatively mounted in the chamber, the energy absorbing medium having an outer diameter at least equal to an inner diameter of the support cylinder and a volume less than the volume of the chamber, said energy absorbing medium including a plurality of longitudinal side walls parallel to the longitudinal axis of said energy absorbing medium, and only some of said side walls being in full-time engagement with an inner wall of said hollow support cylinder;

(c) a compressed, resilient preload piston unit having a first end in communication with the energy absorbing medium;

(d) a piston tube having inner and outer ends, wherein the inner end is in communication with a second end of the preload piston unit and telescopingly received in the chamber and the outer end is attached to the bumper assembly;

whereby the preload piston unit expands after an impact load applied to the bumper assembly;

whereby the preload piston unit expands after an impact load applied to the bumper assembly is removed and the energy absorbing medium recovers to a length less than its preload length so that the bumper assembly returns to a pre-impact position.

4. The energy absorber as specified in claim 3 wherein the energy absorbing medium comprises an elongated bar of generally triangular cross section having arcuate and spaced truncations in contact with the inner diameter of the support cylinder.

5. The energy absorber as specified in claim 4 wherein the elongated bar is not compressed in the chamber prior to the application of a load to the bumper assembly.

6. The energy absorber as specified in claim 5 wherein the bar is constructed from HYTREL.

7. The energy absorber as specified in claim 3 wherein the preload piston unit comprises a spring.

* * * * *